M. BESHENICH.
FLYING MACHINE.
APPLICATION FILED SEPT. 1, 1920.
1,361,810.
Patented Dec. 14, 1920.
3 SHEETS—SHEET 1.
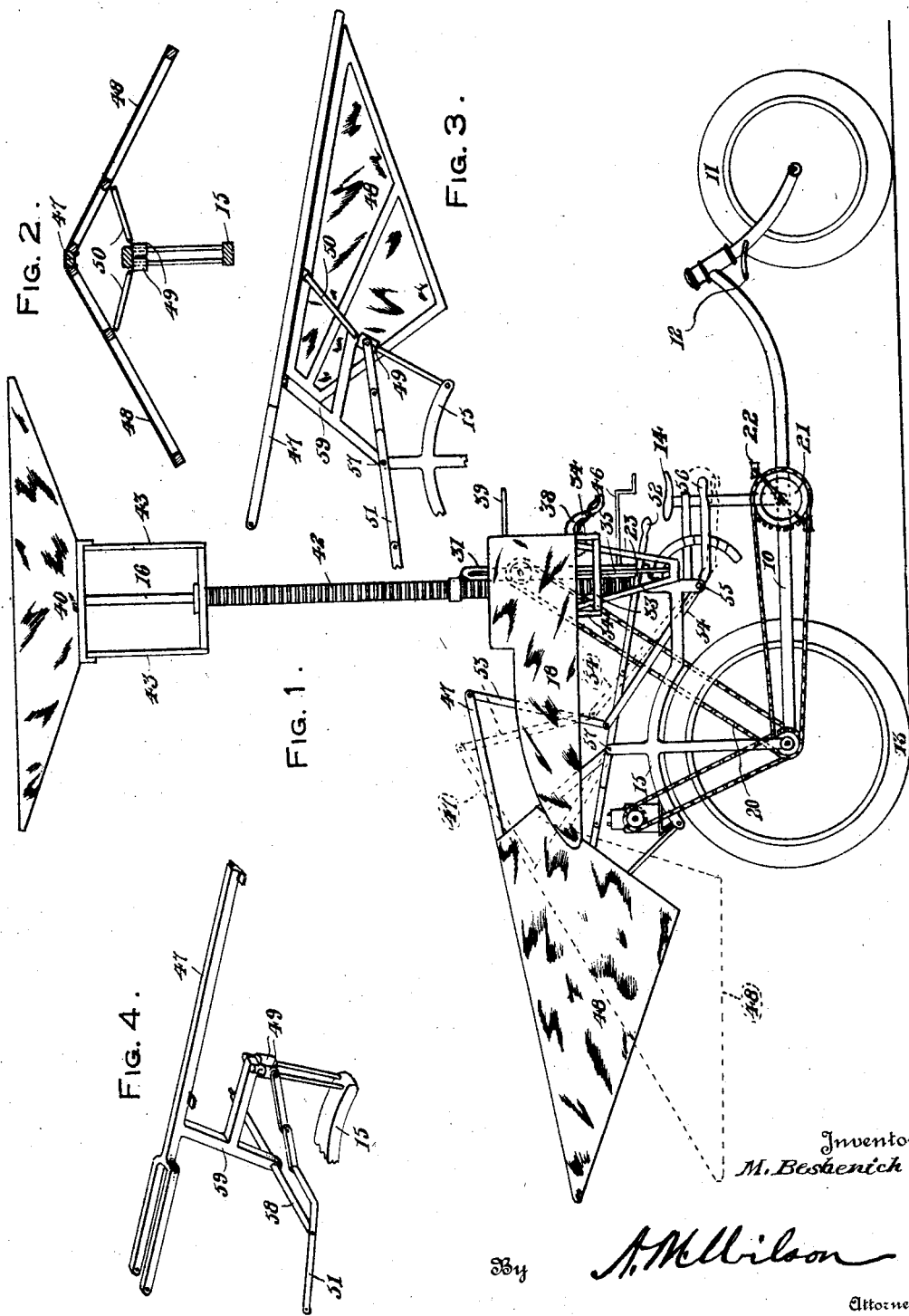
Inventor
M. Beshenich
By A. M. Wilson
Attorney

M. BESHENICH.
FLYING MACHINE.
APPLICATION FILED SEPT. 1, 1920.

1,361,810.

Patented Dec. 14, 1920.
3 SHEETS—SHEET 2.

FIG. 6.
FIG. 12.
FIG. 5.
FIG. 7.

Inventor
M. Beshenich

By A. K. Wilson

Attorney

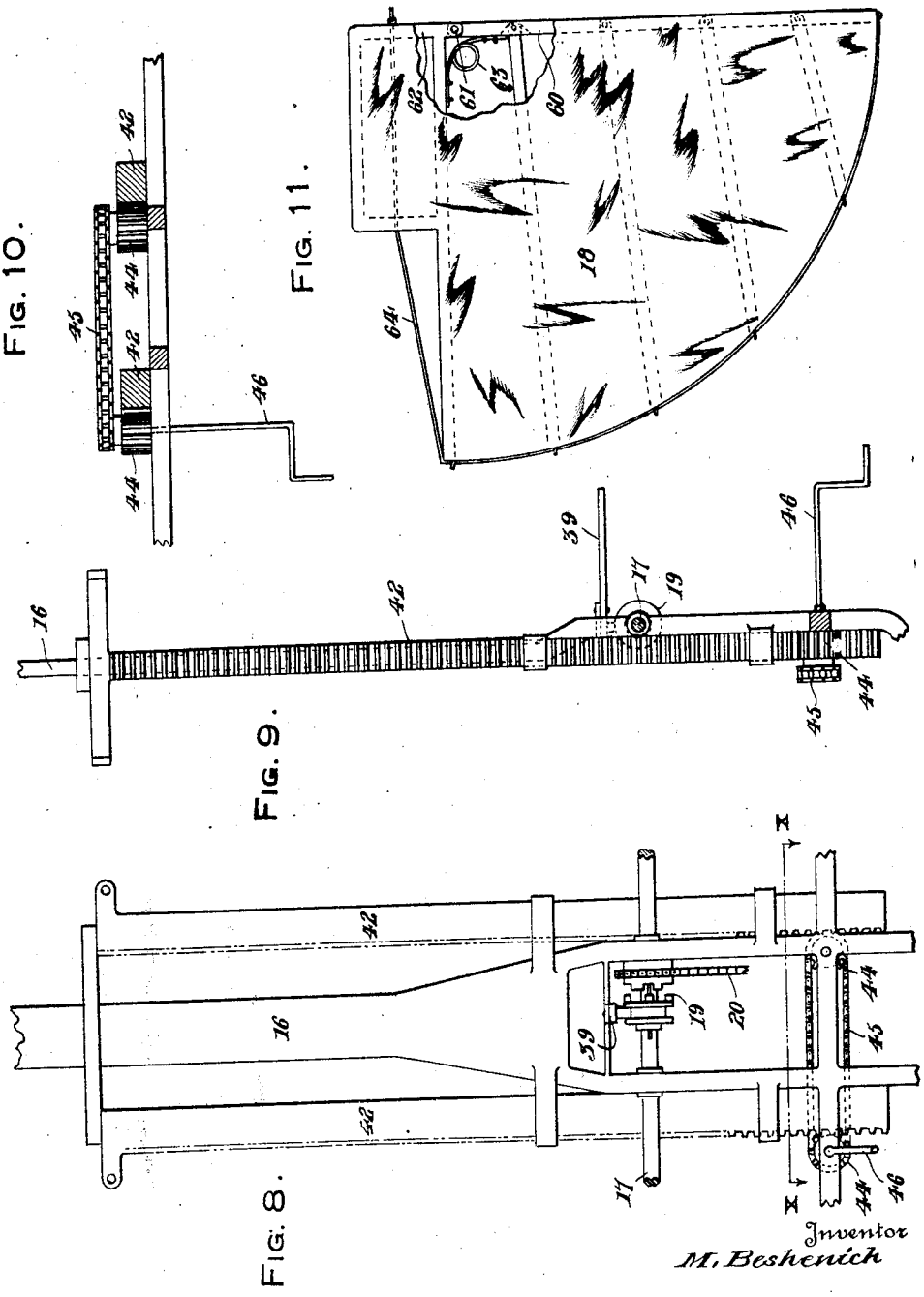

UNITED STATES PATENT OFFICE.

MATIJA BESHENICH, OF BEATTY, PENNSYLVANIA.

FLYING-MACHINE.

1,361,810.  Specification of Letters Patent.  Patented Dec. 14, 1920.

Application filed September 1, 1920. Serial No. 407,446.

*To all whom it may concern:*

Be it known that I, MATIJA BESHENICH, a citizen of Jugo-Slavia, residing at Beatty, in the county of Westmoreland and State of Pennsylvania, have invented certain new and useful Improvements in Flying-Machines, of which the following is a specification.

The primary object of the invention is to provide a flying machine adapted for ready propulsion by the occupant for traveling through the air as well as gliding over and adjacent the ground, controlled and steered as may be found desirable.

Another object of the invention is to provide a flying machine having flapping wings adapted for tilting during the steering operation, the propelling and tilting of the wings being readily accomplished adjacent the driver's seat.

A still further object of the invention is the provision of a flying machine having an adjustable parachute or plane permitting safe descent to the earth in the case of an accident, the machine also having manually operable folding wings as well as an adjustable empennage.

With these general objects in view, the invention consists of the combination and arrangement of parts herein more fully described in connection with the accompanying drawings and in which like reference characters designate corresponding parts throughout the several views.

In the drawings,

Figure 1 is a side elevation of the invention in its operative position with the empennage illustrated by dotted lines in its lowered position, Fig. 2 is a vertical transverse sectional view taken through the empennage, Fig. 3 is an elevational view of a side portion thereof, Fig. 4 is a perspective view of the frame of the empennage, Fig. 5 is a vertical transverse sectional view of the invention, Fig. 6 is a perspective view illustrating part of the operating mechanism for one of the side wings, Fig. 7 is a detail view with parts in section showing the tilting means for the side wings and illustrating by dotted lines the same in its adjusted position, Fig. 8 is an enlarged elevational view of a central portion of the machine including the parachute operating means, Fig. 9 is a vertical sectional view thereof, Fig. 10 is a transverse sectional view taken upon line X—X of Fig. 8, and Fig. 11 is an elevational view of one of the foldable wings with the parts broken away.

Fig. 12 is a fragmentary detail sectional view of the mechanism for operating one of the wings.

Referring more in detail to the drawings, I provide a frame 10 similar to that of a bicycle or motorcycle with a front wheel 11, foot rests 12, a rear wheel 13 and a saddle or seat 14. A support 15 carried by the frame 10 has a central upright or beam 16 slightly rearwardly of the seat 14. A drive shaft 17 for flapping wings 18 is journaled through the beam 16 connected by a clutch 19 with a sprocket chain 20 operatively connected to the rear wheel 13 for driving simultaneously with said rear wheel by means of the sprocket 21 and pedals 22 beneath the driver's seat 14.

A triangular hinge member 23 is provided for each wing 18 having the horizontal portion 24 thereof uppermost and connected by hinges 25 with the adjacent inner edge of the wing 18. Oppositely projecting arms 26 upon the beam 16 are provided with curved levers 27 at their outer free ends while the lower ends of the levers are connected by braces 28 with the lower or apex ends 29 of the hinge members 23.

The outer ends of the shaft 17 are slidably connected by bolts 30 with the upright slotted portions 31 of L-shaped members 32 having outer cross pieces 33 pivotally connected by links 34 with the adjacent wing 18. The L-shaped members 32 are vertically slidable upon rods 35 carried by the hinge members 23 while a pitman 36 pivotally connects each of said members 32 with the wrist of a crank 37 at the adjacent end of the shaft 17.

The turning of the shaft 17 by operating the pedals 22 causes the two pitmen 36 to move the L-shaped members 32 vertically, thereby moving the wings 18 up and down on the hinges 25 after the manner of flapping wings, this operation being calculated to assist the machine in floating through the air after the manner of a glider. Forwardly projecting handles 38 upon the levers 27 are grasped by the operator when seated upon the saddle 14 and upon moving the handles 38 either upwardly or downwardly, the wings 18 are selectively tilted as found desirable for assisting the steering operation as well as the gliding of the aircraft by the adjustment of the wings 18 for receiving the pressure of the air therebeneath. The clutch 19 is operated by a similar lever 39 so that the wings 18 may be connected with or disconnected from the operating sprocket 21 at will.

Planes or canopy sections 40 are hinged to a top piece 41 upon the beam 16 adapted to serve as a parachute as well as a sustaining plane for the aircraft. A vertically movable rack 42 at the sides of the beam 16 are connected by links 43 with the adjacent canopy section 40 for opening and closing the same at will. Pinions 44 in mesh with said racks 42 are carried by the beam 16 connected by a sprocket chain 45 and adapted for turning by a crank 46 whereby the racks 42 are simultaneously lowered or elevated by the driver of the machine whenever occasion requires.

The empennage consists of a rail 47 having wings 48 hinged to the opposite sides thereof, these wings 48 being opened or closed by means of slidable sleeves 49 connected to the wings 48 by links 50 and operated by an articulated lever 51 having a handle 52 adjacent the driver's seat 15. A lever 53 pivoted to the forward end of the rail 47 is pivoted to an angular lever 54 pivoted as at 55 to the support 15 and having an operating handle 56 adjacent the driver's seat 14 for elevating and lowering the empennage as illustrated in Fig. 1 of the drawings. The lever 51 being pivoted at 57 to a rod 58 carried by the support 15 with a branch portion 59 of the rail 47 also carried thereby, it will be seen that a movement of the handle 52 for elevating the sleeves 49 will open the wings 48, while lowering the sleeves 49 effects a closing of the empennage wings 48.

Each of the flapping wings 18 has its longitudinal rib 60 hinged as at 61 to the main frame 62 of the wing and normally held open by a spring 63 and readily closed by pulling a cord 64 as best illustrated in Fig. 11 of the drawings. The complete operation of the invention will be fully understood from this detail description thereof, the rider upon the seat 14 initially propelling the device along the ground by means of the pedals 22 with the clutch 19 disengaged. Upon closing the clutch 19, the wings 18 are given a flapping motion and the incline thereof controlled by the levers 38 which tends to elevate the machine off of the ground in a gliding motion through the air. The canopy 40 is closed or outstretched as may be desired while the empennage wings 48 are controlled by the levers 52 and 56 as found desirable. The side wings 18 are adapted for tilting selectively during the simultaneous flapping movement of said wings when the clutch 19 engages the shaft 17 with the sprocket chain 20.

While the form of the invention herein set forth and described is believed preferable, it is understood that minor changes may be made therein without departing from the spirit and scope of the invention.

What is claimed as new is:—

1. A flying machine comprising a wheeled support, a crank shaft transversely journaled upon said support, propelling means for the support and shaft, wing mounts pivoted to said support, wings hinged to said mounts at opposite sides of the machine, L-shaped operating members slidably carried by said mounts pivotally connected to the wings, and link connections between said L-shaped members and the wrists of the crank shaft.

2. A flying machine comprising a wheeled support, a crank shaft transversely journaled upon said support, propelling means for the support and shaft, wing mounts pivoted to said support, wings hinged to said mounts at opposite sides of the machine, L-shaped operating members slidably carried by said mounts pivotally connected to the wings, link connections between said L-shaped members and the wrists of the crank shaft, handles carried by the mounts adapted for selectively tilting the mounts and wings, and folding means carried by the wings.

3. A flying machine comprising a bicycle having a rear drive wheel and operating pedals, a support carried by the bicycle, an upright beam carried by the support, a crank shaft journaled in the beam transversely above the bicycle, operative connections between said shaft and the drive wheel of the bicycle, clutch means upon the shaft for said connections operable adjacent the driver's seat of the bicycle, mounts swingingly carried by the beam adjacent the opposite ends of the shaft, wings hinged at their inner ends to said mounts, L-shaped members slidably carried by said mounts operatively connected to the wings, the shaft having a crank portion adjacent each of its opposite ends, and operative connections between the cranks of the shaft and said L-shaped members whereby the wings are adapted for flapping movement during the turning of the shaft when the clutch is in its engaging position.

4. A flying machine comprising a bicycle having a rear drive wheel and operating pedals, a support carried by the bicycle, an upright beam carried by the support, a crank shaft journaled in the beam transversely above the bicycle, operative connections between said shaft and the drive wheel of the bicycle, clutch means upon the shaft for said connections operable adjacent the driver's seat of the bicycle, mounts swingingly carried by the beam adjacent the opposite ends of the shaft, wings hinged at their inner ends to said mounts, L-shaped members slidably carried by said mounts operatively connected to the wings, the shaft having a crank portion adjacent each of its opposite ends, operative connections between the cranks of the shaft and said L-shaped members whereby the wings are adapted for flapping movement during the turning of the shaft when the clutch is in its engaging position, the said L-shaped members having longitudinal slots, the shaft having terminal portions outwardly of the cranks slidably positioned in said slots, forwardly projecting handles carried by the mounts adapted for imparting independent tilting movement to said mounts and wings, and folding means provided for the said wings.

5. A flying machine comprising a bicycle having a rear drive wheel and a driver's seat, a support carried by the bicycle, flapping wings operatively pivoted at opposite sides of the support, driving connections between the wings and bicycle, a controlling clutch for the wings, a tilting handle for the wings positioned adjacent the driver's seat, a foldable tail pivotally carried by the support, folding means for the tail, tilting means for the tail carried by the support operable adjacent the driver's seat of the bicycle, an upright beam carried by the support, opposite planes hinged to the top of the beam, vertically adjustable racks slidably carried by the beam, link connections between the racks and planes, and simultaneous operating means for the racks adapted for actuation at a point adjacent the driver's seat.

In testimony whereof I affix my signature.

MATIJA BESHENICH.